117,485

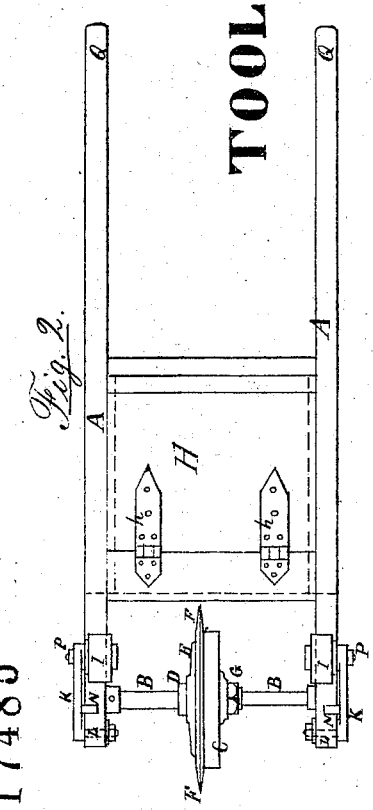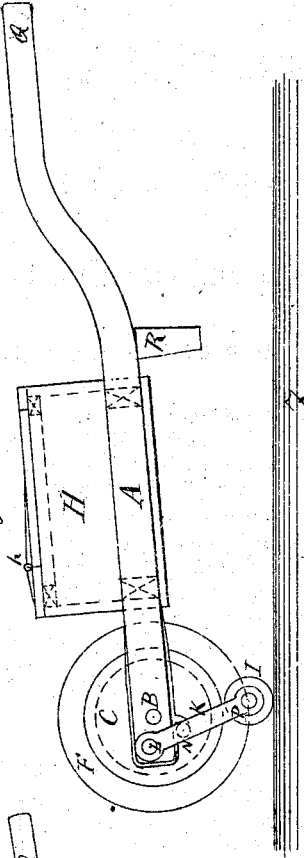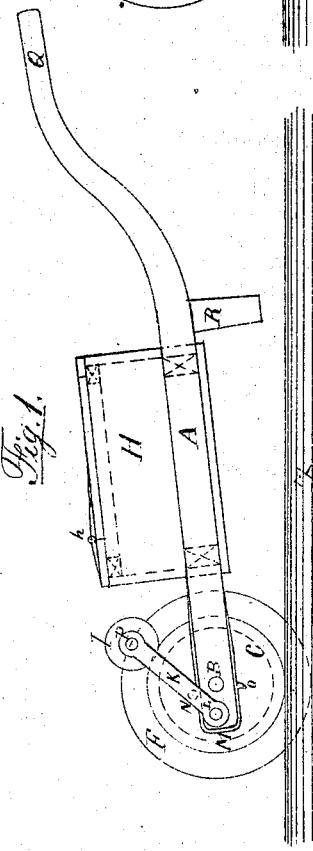

UNITED STATES PATENT OFFICE.

ADOLPHE TOURNIER, OF BARNVILLE, NEW YORK.

IMPROVEMENT IN GARDEN-TOOLS FOR TRIMMING SODS.

Specification forming part of Letters Patent No. 117,485, dated July 25, 1871.

*To all whom it may concern:*

Be it known that I, ADOLPHE TOURNIER, of Barnville, in the county of Orange and State of New York, have invented a new Gardener's Tool for Trimming Sod; and I do hereby declare that the following is a full, clear, and exact description of the same, reference being had to the accompanying drawing and to the letters of reference marked thereon.

Figure 1 is a side view of the apparatus when in operation. Fig. 2 is a plan of the same. Fig. 3 represents a side view of the machine when being moved without working.

The nature of my invention consists in the construction of a revolving knife, and a suitable apparatus to use the same, for trimming the lawns in gardens along their borders to a certain depth, in place of cutting the sod straight by means of a spade or any other sharp instrument. In gardens where the long pleasure-walks or the flower-beds are inclosed by sod, it gives the same a very neat appearance if the edges of the sod are sharp-trimmed, and the gravel walks clean of any grass or roots from the sod near by. To do this work quick, and better than it could be done by a spade, I take an instrument which in its appearance resembles a wheelbarrow, but which has attached next to the wheel, on one side and to the same axis, a sharp circular blade, as much larger than the wheel as the blade shall go in the ground. If the wheelbarrow is drawn over garden-land or sod, the sharp blade will cut in the ground, and the wheel will serve as a gauge how deep the blade shall cut in the ground at the furthest. If this blade shall cut the edges of the lawn, the wheelbarrow is drawn or pushed so that the wheel runs on the edge of the lawn and the blade on the outside of the same. The cut-off pieces of sod are easily removed by a rake after being cut loose from the lawn. As the machine cuts only by its own weight, a box is constructed on the frame of the wheelbarrow in which to place weights for the purpose of forcing the blade down in the ground, in case the wheelbarrow should not be heavy enough alone. The same time the box serves to keep tools, as a hammer, screw-wrench, an extra blade, files, and a small stone to sharpen the edge of the blade attached to the machine, as they may be needed at any moment when the same is in use. This cutting-blade is fastened to the shaft like a saw on a saw-mandrel, and it takes some time to take a blade out or to put another in again. If the machine is in use and has to be transported from one place to another over a plot where no cutting shall be done, or over a plastered road which will hurt the edge of the blade, I have, to avoid taking the knife out for the purpose of rolling the wheelbarrow on its wheel, attached to each side of the wheelbarrow, near the shaft, an extra roller on an arm, which can be thrown up and rest on the wheelbarrow when the machine is in use, and which, when turned down, lets the rollers roll on the ground, while the wheel and the blade are several inches above the ground, so that the wheelbarrow can be transported over the ground without the blade cutting or touching the ground.

To explain this better I refer to the annexed drawing, in which A A represents the frame of the wheelbarrow; B B, the shaft; C, the wheel; Q Q, the handles; H, the body or the box with a lid or hinges, $h\ h$, to receive the tools and the weights. F is the circular blade or cutter, fastened on the shaft and held to the wheel C by a collar, D, and washer, E, on one side, and a collar and a nut, G, on the other side, which clamp it tightly between washer E and wheel C. At M, near the end of the frame, are fastened the two arms K K, by pins L L running through the frame, and the rollers I I are fastened to the other ends by pins P P. To the arms K K are fastened two pins, N N, projecting inside in such a way that the pins N N will rest on top of the frame A when the arms with rollers are thrown up in a position as shown in Fig. 1, when the machine is in operation. The same pins N N will hold the arms K K in their places by lying against a projection, $o\ o$, on the iron strap on the under side of the frame A, when they are turned down for the purpose of letting the weight of the wheelbarrow rest on the rollers I I, and to lift the blade F above the ground when transporting the machine and when not in operation, as shown in Fig. 3.

What I claim as my invention, and desire to secure by Letters Patent, is—

The gardener's tool, composed of frame A with box H attached, shaft B with cutter F and guide-roller C, and provided with the auxiliary rollers I I on arms K K, the whole to be used by hand for the purpose of trimming the outside edges of sod or of the lawn, as specified.

ADOLPHE TOURNIER.

Witnesses:
ALBERT NOE,
JNO. C. NOE.